(12) United States Patent
Kim et al.

(10) Patent No.: US 8,416,278 B2
(45) Date of Patent: Apr. 9, 2013

(54) SYSTEM AND METHOD FOR REAL-TIME CONVERSATIONAL TELE-EDUCATION SERVICE BASED ON VIDEO CONFERENCING SERVICE

(75) Inventors: Hwa-Suk Kim, Daejeon-si (KR);
Kee-Seong Cho, Daejeon-si (KR);
Sang-Kwon Kim, Daejeon-Si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 247 days.

(21) Appl. No.: 12/948,393

(22) Filed: Nov. 17, 2010

(65) Prior Publication Data

US 2011/0149011 A1    Jun. 23, 2011

(30) Foreign Application Priority Data

Dec. 21, 2009    (KR) .......................... 10-2009-0127871

(51) Int. Cl.
*H04N 7/15*    (2006.01)

(52) U.S. Cl.
USPC ................... 348/14.08; 348/14.09; 348/14.03

(58) Field of Classification Search .... 348/14.01–14.16; 434/350, 323, 362; 381/122
See application file for complete search history.

(56) References Cited

U.S. PATENT DOCUMENTS

| | | | | |
|---|---|---|---|---|
| 2003/0203347 | A1* | 10/2003 | Notomi | 434/350 |
| 2005/0012812 | A1* | 1/2005 | Seo | 348/14.09 |
| 2007/0030984 | A1* | 2/2007 | Gotfried | 381/122 |
| 2010/0007713 | A1* | 1/2010 | Yamamoto | 348/14.08 |

FOREIGN PATENT DOCUMENTS

| | | |
|---|---|---|
| KR | 10-0233527 | 9/1998 |
| KR | 1998-066389 | 10/1998 |
| KR | 10-0665135 | 6/2006 |
| KR | 1020090017163 | 2/2009 |

* cited by examiner

*Primary Examiner* — Melur Ramakrishnaiah
(74) *Attorney, Agent, or Firm* — Nelson Mullins Riley & Scarborough LLP; EuiHoon Lee, Esq.

(57) ABSTRACT

A system and method for a tele-education service system based on video conferencing are provided. The tele-education service system includes a host terminal to manage a tele-education service system; at least one participating terminal to receive the tele-education service; and a media relay to acquire video images from the host terminal and the at least one participating terminal, to combine the acquired video images differently according to user information of the host terminal and the at least one participating terminal and the progress stages of video conferencing and to provide the differently combined video images to the host terminal and the at least one participating terminal, respectively.

22 Claims, 11 Drawing Sheets

SYSTEM AND METHOD FOR REAL-TIME CONVERSATIONAL TELE-EDUCATION SERVICE BASED ON VIDEO CONFERENCING SERVICE

CROSS-REFERENCE TO RELATED APPLICATION

This application claims the benefit under 35 U.S.C. §119(a) of a Korean Patent Application No. 10-2009-0127871, filed on Dec. 21, 2009, the entire disclosure of which is incorporated herein by reference for all purposes.

BACKGROUND

1. Field

The following description relates to a tele-education service, and more particularly, to a real-time conversational tele-education service based on video conferencing.

2. Description of the Related Art

A video conferencing service system allows people at distant places to attend a conference and hold discussions in real time through video screens.

A tele-education service provides educational content to terminals through channel broadcasting or video-on-demand. In the tele-education service, a service provider provides the same educational content to users regardless of the users' learning levels and the users can selectively see and hear the educational content.

Meanwhile, a tele-education service system based on video conferencing allows a lecturer that manages a tele-education lecture to participate in video conferencing with students that have registered for the tele-education lecture and to hold the tele-education lecture in real time according to the students' learning levels.

In order to repeatedly hold a certain lecture or to improve the effect of education, the lecturer needs to hold lectures often using lecture materials in the form of video. In this case, in order to attend the lecture provided in the form of video, the students may need another type of a terminal application function for sharing the lecture materials, as well as a video conferencing function.

Furthermore, a video conferencing service system combines video images received from a plurality of terminals and provides the combined video images to all the terminals. However, while a lecturer needs to check the states of all students in order to answer questions and hold a discussion in the tele-education service, if receiving video images from all other students, the students may lose their concentration on the lecture.

SUMMARY

The following description relates to a system and method for a real-time conversational tele-education service that can provide an on-demand tele-education service based on video conferencing.

The following description also relates to a system and method for a real-time conversational tele-education service that can receive various types of video without having to installing any separate application program in a conferencing terminal.

In one general aspect, there is provided a media relay which relays a tele-education service based on video conferencing between terminals, including: an image acquiring unit to acquire video images from a plurality of terminals; and an image provider to combine the acquired video images differently according to user information of the plurality of terminals and the progress stages of video conferencing and to provide the differently combined video images to the plurality of terminals, respectively.

In another general aspect, there is provided a host terminal which manages a tele-education service based on video conferencing with at least one participating terminal, including: an image selector to select one of video images acquired through an interface connected to the host terminal and video images output through an application program of the host terminal; and a selected image provider to provide the selected video image to the at least one participating terminal through a network.

In another general aspect, there is provided a tele-education service system based on video conferencing, including: a host terminal to manage a tele-education service system; at least one participating terminal to receive the tele-education service; and a media relay to acquire video images from the host terminal and the at least one participating terminal, to combine the acquired video images differently according to user information of the host terminal and the at least one participating terminal and the progress stages of video conferencing and to provide the differently combined video images to the host terminal and the at least one participating terminal, respectively.

In another general aspect, there is provided a method of providing a tele-education service based on video conferencing, including: acquiring video images from a host terminal that manages a tele-education service and at least one participating terminal that receives the tele-education service; combining the acquired video images differently according to user information of the host terminal and the at least one participating terminal and the progress stages of video conferencing; and providing the differently combined video images to the host terminal and the at least one participating terminal, respectively.

Therefore, an on-demand tele-education service based on video conferencing may be provided. That is, the tele-education service system may combine acquired video images differently according to user information of a plurality of terminals that are to receive a video conferencing service and the progress of conferencing, and provide the differently combined video images to the plurality of terminals, respectively.

Accordingly, a lecturer may adjust lecture content according to students' learning levels by providing different video images to the students' terminals according to user information of the students' terminals.

Furthermore, it is also possible to provide different video images according to lectures and students. Accordingly, each lecturer may recognize the states of all students in real time by viewing video images acquired from the students' terminals. In addition, the students may concentrate on a lecture held by the lecturer by receiving video images only from the lecturer's terminal. Particularly, the tele-education service based on video conferencing may proved conversational education in a debate format such as small group education to provide an on-demand education service.

According to another example, a student can receive various formats of video images without having to install any separate application program in the student's terminal. Particularly, each student may receive multimedia education in real time with his or her video conferencing terminal or video phone terminal while sharing video images created through an application program of a lecturer's terminal.

Accordingly, when the same subject or content is repeatedly provided to a student, the lecturer may lecture in a manner to provide pre-stored video images to the student, and answer questions and hold a discussion as necessary in real time, thereby enhancing the efficiency of the lecture.

Other features and aspects will be apparent from the following detailed description, the drawings, and the claims.

Figure 1:
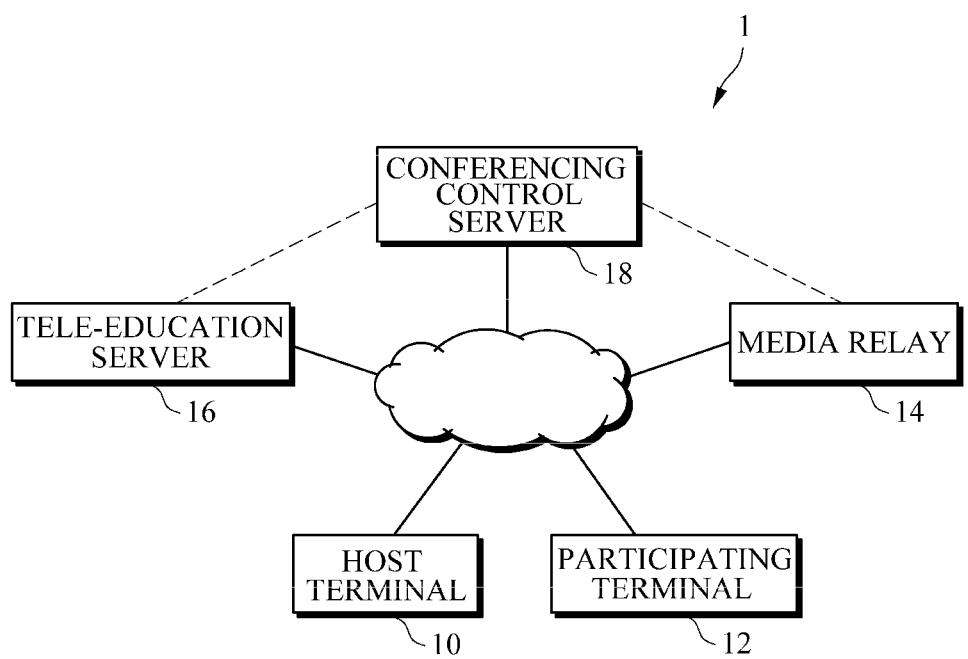
FIG. 1 illustrates a configuration example of a tele-education service system based on video conferencing.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates a configuration example of a tele-education service system 1 based on video conferencing.

Referring to FIG. 1, the tele-education service system 1 includes a host terminal 10, a participating terminal 12, a media relay 14, a tele-education server 16 and a conferencing control server 18.

A video conferencing service system provides video conferencing that is run while sharing multimedia data including video and voice between two or more terminals. The tele-education service system 1 according to the current example may provide a real-time video conferencing service combined with a tele-education service. The tele-education service is a type of multimedia education that allows a lecturer and a student to transmit and receive educational content in real time at remote places. The tele-education service system 1 supports a tele-education service based on video conferencing between the host terminal 10 that manages a tele-education service and the participating terminal 12 that receives the tele-education service. A user of the host terminal 10 may be a lecturer and a user of the participating terminal 12 may be a student. Also, there may be a plurality of participating terminals. When a user of the participating terminal 12 is a student, the student may participate in video conferencing to attend a lecture held through the tele-education server 16 and conduct conversational communications of asking a lecturer questions or answering questions from the lecturer while the lecture is in progress.

The host terminal 10 and participating terminal 12 include input/output devices that are supported for a general video conferencing service. For example, the host terminal 10 and participating terminal 12 each include a display for acquiring video images from a camera and displaying them and a replay unit for acquiring voice from a microphone and reproducing it.

Specifically, the host terminal 10 includes an application program which can output multimedia data including video images, still images and text onto a screen. Also, the host terminal 10 includes a communication unit which can transmit video images output onto the screen through the application program to a network.

Meanwhile, the media relay 14 acquires respective video images from the host terminal 10 and participating terminal 12. Then, the media relay 14 combines the acquired video images differently according to user information of the host terminal 10 and participating terminal 12 and the progress stages of the video conferencing, and provides the differently combined video images to the host terminal 10 and the participating terminal 12, respectively. At this time, the media relay 14 selectively mixes the video images to split screens and then performs codec conversion. A technique of mixing acquired video images to split screens and converting a codec is well-known in the related art and accordingly a detailed description thereof will be omitted.

User information of each terminal, which is information verifying the identity of a user using the terminal, may indicate a lecturer or student in the tele-education service. The progress stages of the video conferencing may be the progress of tele-education indicating that the lecturer is giving a lecture, that the student is asking a question, that the lecturer is responding to a question from the student, etc.

Meanwhile, the tele-education server 16 remotely manages an education service based on video conferencing. For example, the tele-education server 16 controls lecturers to open lectures, manages the opened lectures and supports students to register for a desired lecture after checking the content of the lectures, in order to provide a tele-education service. Then, the tele-education server 16 may notify the host terminal 10 so that the host terminal 10 starts a lecture according to a schedule of the opened lectures or request the host terminal 10 in the form of a request from a third party so that the host terminal 10 opens video conferencing.

The conferencing control server 18 receives a request signal for opening video conferencing from the tele-education server 16 or the host terminal 10 and establishes a video conferencing session. Then, the conferencing control server 18 controls a connection between the participating terminal 12 and the media relay 14. The conferencing control server 18 controls the media relay 14 to perform image mixing and transcoding according to characteristics (user information?) of each terminal, the progress stages of the video conferencing such as control of the floor during the video conferencing, etc.

According to an example, control messages between the host terminal 10, the participating terminal 12, the conferencing control server 18 and the media relay 14 may be received and transmitted through an information management system call session control function (IMS CSCF).

Figure 2:
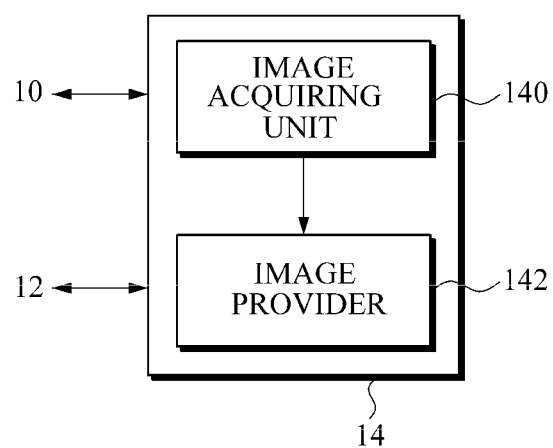
FIG. 2 is a diagram illustrating an example of a media relay.

FIG. 2 is a diagram illustrating an example of the media relay 14.

Referring to FIG. 2, the media relay 14 includes an image acquiring unit 140 and an image provider 142.

The image acquiring unit 140 acquires video images from a plurality of terminals. In the current example, the image acquiring unit 140 may acquire video images from the host terminal 10 that manages a tele-education service and the participating terminal 12 that receives the tele-education service.

Meanwhile, the image provider 142 combines the acquired video images differently according to user information of a plurality of terminals and the progress stages of video conferencing and then provides the differently combined video images to the terminals, respectively. When the host terminal 10 is a lecturer's terminal and the participating terminal 12 is a student's terminal, user information of each terminal indicates whether a user using the terminal is a lecturer or a student. The progress stages of video conferencing may be the progress of tele-education indicating that the lecturer is giving a lecture, that the student is asking a question, that the lecturer is responding to a question from the student, etc.

According to an example, the image provider 142 mixes video images acquired by a plurality of participating terminals and provides the mixed video images to the host terminal 10. Then, the image provider 142 may provide video images acquired by the host terminal 10 to the participating terminals 12. At this time, the image provider 142 mixes the acquired video images to split screens and provides the split screens to the participating terminals 12, respectively.

According to another example, the image acquiring unit 140 acquires video images from a host terminal 10 and the image provider 142 provides the acquired video images to a plurality of participating terminals 12. Here, the video images acquired by the host terminal 10 may be video images acquired by a camera connected to the host terminal 10 or video images output through an application program of the host terminal 10.

According to another example, when receiving a signal for requesting the floor from one of a plurality of participating terminals 12, the image provider 142 mixes video images acquired by the plurality of participating terminals 12 and provides the mixed video images to the host terminal 10. Then, the image provider 142 mixes video images acquired by the host terminal 10 with video images acquired by the participating terminal that has sent the signal for requesting the floor and provides the mixed video images to the participating terminals 12.

According to another example, when receiving a signal for requesting the floor from the host terminal 10, the image provider 142 mixes video images acquired by a plurality of participating terminals 12 and provides the mixed video images to the host terminal 10. Then, the image provider 142 provides video images acquired by the host terminal 10 to the participating terminals 12.

According to another example, the image provider 142 mixes acquired video images differently according to participating terminals 12 and provides the differently mixed video images to the participating terminals 12, respectively. For example, the image provider 142 may mix video images acquired by a host terminal 10 and a second participating terminal and provide the mixed video images to a first participating terminal, and mix video images acquired by the host terminal 10 and the first participating terminal and provide the mixed video images to the second participating terminal.

According to another example, the image provider 142 may provide voice and video images received from a terminal that has sent a signal for requesting the floor to a plurality of terminals. For example, when a first participating terminal has sent a signal for requesting the floor, the image provider 142 may provide voice and video images received from the first participating terminal to other terminals.

As described above, an on-demand tele-education service can be provided. In other words, the media relay 14 provides different video images to different users according to user information of the users' terminals so as to adjust the content of an education service according to a learning level of a user who possesses a participating terminal 12.

Particularly, when a tele-education service is provided, the media relay 14 may provide different video images to different lecturers or students. Accordingly, each lecturer can recognize the states of students in real time by viewing video images from the students. Also, since the students receive only video images from a lecturer or a speaker, they may maintain good concentration on the lecturer.

Meanwhile, examples of various scene-mapping techniques that are performed by the image provider 142 will be described in detail with reference to FIGS. 5A through 5E, later.

Figure 3:
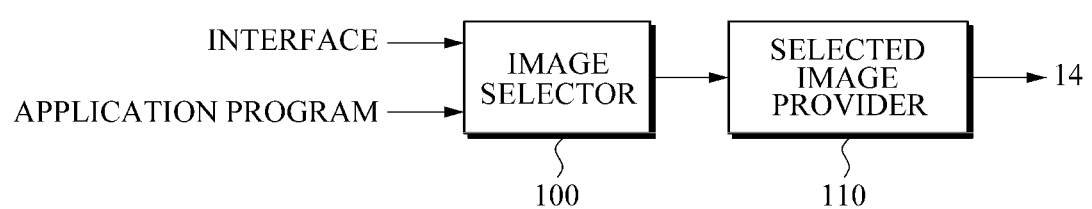
FIG. 3 is a diagram illustrating an example of a host terminal.

FIG. 3 is a diagram illustrating an example of the host terminal 10.

Referring to FIG. 3, the host terminal 10 includes an image selector 100 and a selected image provider 110.

The image selector 100 selects one of video images acquired through an interface connected to the host terminal 10 or video images output through an application program of the host terminal 10. The interface includes all electronic devices connectable to the host terminal 10 and may be a camera or a microphone. The application program is a program that outputs multimedia data including at least one of pre-stored video images, still images and text. For example, the application program may be a video replay program, an image viewer program or a text viewer program.

According to an example of a method in which the image selector 100 selects video images, the host terminal 10 whose user is a lecturer may select one of video screens of the lecturer photographed by a camera and video screens output through a video replay program, as a video screen that is to be provided to the participating terminal 12.

According to an example, when receiving a signal for requesting proceeding of video conferencing from a user, the image selector 100 selects video images acquired through an interface. For example, when receiving a signal for requesting proceeding of video conferencing, such as the case of a lecturer resuming a lecture or the case of a lecturer answering questions from students, the image selector 100 may select video images acquired by a camera.

According to another example, when a lecture needing video images, still images or text files proceeds, the image selector 100 may select video images output through an application program. Accordingly, a participating terminal 12 whose user is a student can receive a tele-education service by sharing content with a lecturer through a screen, without having to install the same application program installed in the host terminal 10.

The selected image provider 110 provides the video images selected by the image selector 100 to a plurality of terminals through a network.

The host terminal 10 may further include an input/output unit for a video conferencing service. The input/output unit includes a video display (not shown) and a voice reproducer (not shown). The video display acquires video images from a camera and displays the acquired video images thereon. The voice reproducer acquires voice from a microphone and reproduces the acquired voice. Also, the host terminal 10 may include an application program controller (not shown). The application program controller outputs video images through an application program to output a screen, captures the screen and transmits it to participating terminals.

Further, the host terminal 10 may further include a selection signal receiver (not shown). The selection signal receiver receives a selection signal for selecting one of video images acquired through an interface or video images output through an application program of the host terminal 10, from a user. Then, the selected image provider 110 may provide video images selected according to the selection signal to the participating terminals.

In this way, each conferencing terminal may receive various types of video without having to install any separate application program therein. In other words, a student that has registered for a tele-education lecture can attend the tele-education lecture in real time while sharing video images created through an application program of a lecturer's terminal with a video conferencing terminal or a video phone terminal.

Accordingly, when the same subject or content is repeatedly provided to a student, the lecturer may lecture by providing pre-stored video images to the student, and answer questions or hold a discussion as necessary, thereby enhancing the efficiency of a lecture.

Figure 4A:
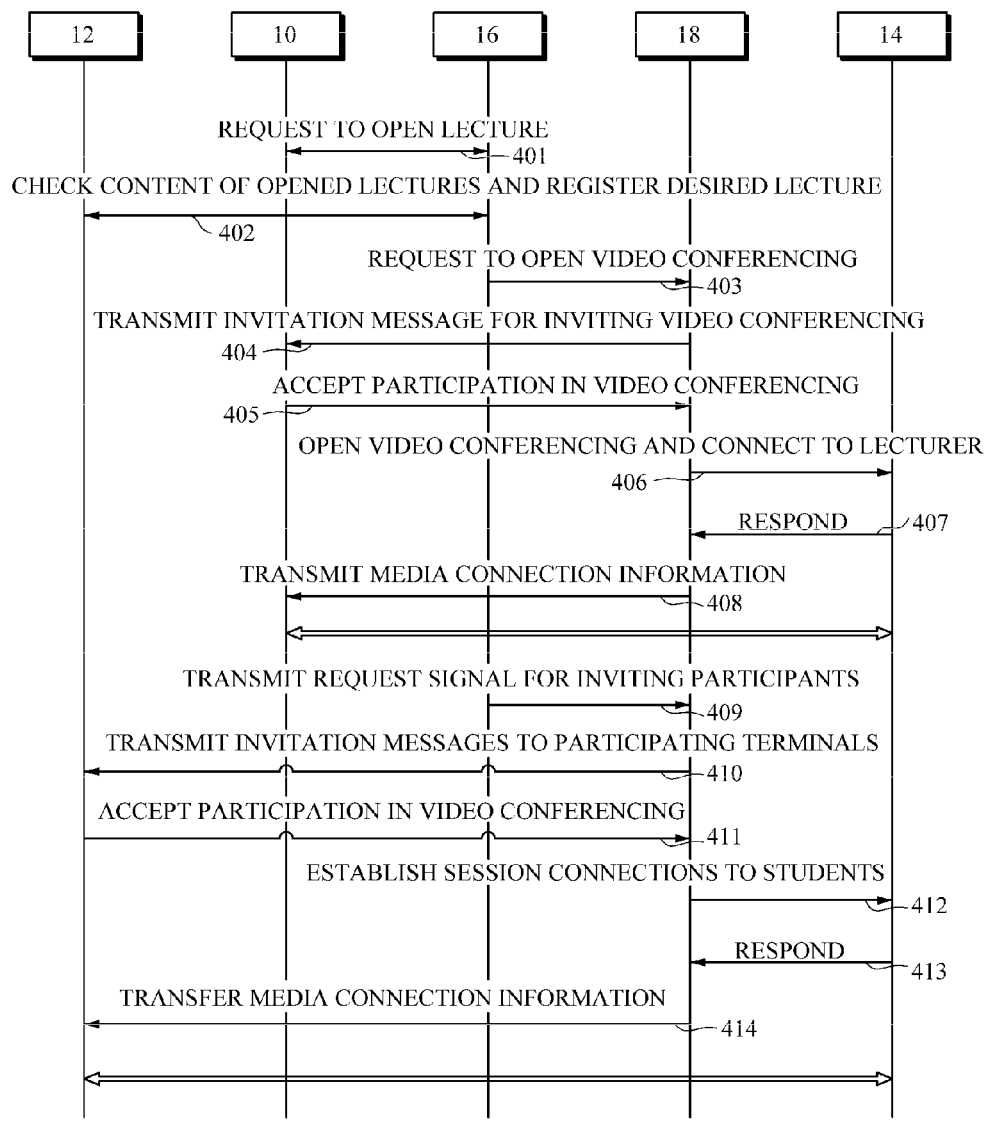
FIGS. 4A and 4B are a flowchart illustrating an example of a procedure for a tele-education service based on video conferencing.
Figure 4B:
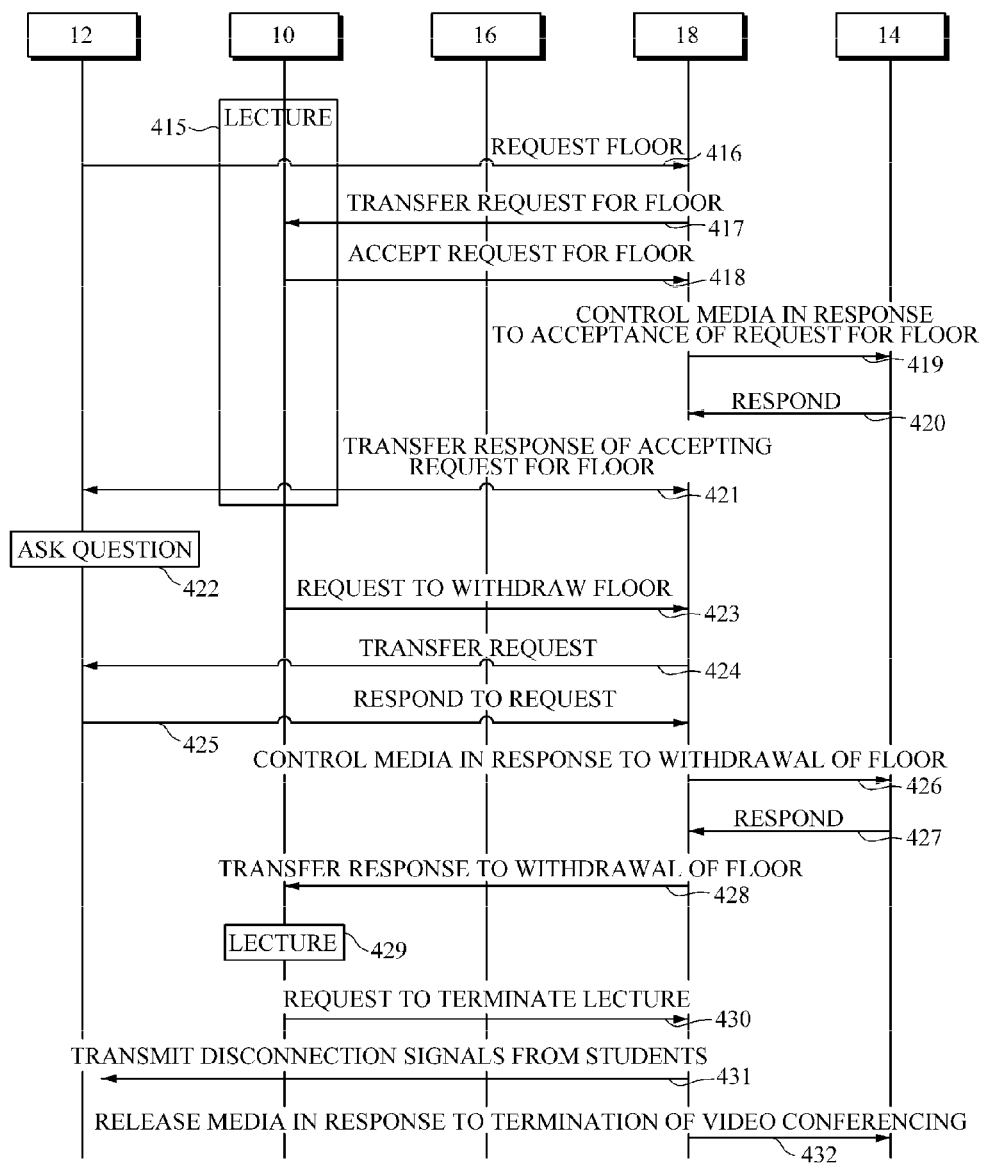

FIGS. 4A and 4B are a flowchart illustrating an example of a procedure for a tele-education service based on video conferencing.

Referring to FIG. 4A, a lecturer requests a tele-education server 16 to open a lecture through a host terminal 10 using the real-time tele-education service system 1 (see FIG. 1) (operation 401). When the lecture is opened, the content, time, history, etc. of the lecture are established. If the tele-education server 16 is implemented in the form of a web portal, the content, time, history, etc. of the lecture may be established through a web and if the tele-education server 16 is implemented in the form of an Internet Protocol Television (IPTV) service, the content, time, history, etc. of the lecture may be established through an Electronic Program Guide (EPG).

Successively, a student accesses the tele-education server 16 through a participating terminal 12 to check the content of opened lectures and then registers a desired lecture (operation 402). At this time, the lecturer may check students that have registered for his or her lecture through the host terminal 10. Meanwhile, opening lectures and registering opened lectures through the tele-education server 16 may be performed through a third party terminal other than the host terminal 10 and the participating terminal 12.

Thereafter, when a time at which a tele-education lecture is scheduled to start arrives, the tele-education server 16 requests a conferencing control server 18 to open video conferencing (operation 403). At this time, the tele-education server 16 may designate a video conferencing host as a lecturer. Then, the conferencing control server 18 transmits an invitation message for inviting the video conferencing to the host terminal 10 (operation 404), and the host terminal 10 accepts participation in the video conferencing in response to the invitation message (operation 405).

Successively, the conferencing control server 18 requests a media relay 14 to open the video conferencing and assign resources for the host terminal 10 (operation 406). Thus, the media relay 14 assigns resources for the tele-education lecture to the conferencing control server 18 and establishes a session connection for the host terminal 10. After assigning the resources for the tele-education lecture, the media relay 14 transmits a response signal to the request for opening the video conferencing, to the conferencing control server 18 (operation 407). Then, the conferencing control server 18 transmits media connection information to the host terminal 10 (operation 408). As a result, a session connection between the host terminal 10 and the media relay 14 is established.

Successively, the tele-education server 16 transmits a request signal for inviting participants to the conferencing control server 18, using a list of students that have registered the tele-education lecture (operation 409). Then, the conferencing control server 18 transmits invitation messages to participating terminals 12 of the students that have registered the tele-education lecture so that the students can participate in video conferencing (operation 410). Then, the participating terminals 12 accept participation in the video conferencing in response to the invitation messages through input signals from the students (operation 411).

Next, the conferencing control server 18 transfers connection information of the participating terminals 12 that have accepted participation in the video conferencing, to the media relay 14, and requests the media relay 14 to establish session connections (operation 412). Then, the media relay 14 assigns resources for the students that participate in the video conferencing, establishes session connections and then transmits a response signal to the conferencing control server 18 (operation 413). Successively, the conferencing control server 18 transfers the connection information received from the media relay 14 to the participating terminals 12, thereby completing session connections between the participating terminals 12 and media relay 14 for the video conferencing.

Successively, referring to FIG. 4B, the tele-education lecture is started through the host terminal 10 (operation 415). At this time, video images created by the host terminal 10 are transferred to the participating terminals 12 of the students via the media relay 14. Also, video images created by the participating terminals 12 are transferred to the host terminal 10 via the media relay 14 so that the lecturer can recognize the states of the students in real time.

Meanwhile, when a student asks a question through his or her participating terminal 12 while the lecture is in progress, the participating terminal 12 transmits a signal for requesting the floor to the conferencing control server 18 (operation 416). Then, the conferencing control server 18 transfers a request for the floor to the host terminal 10 which is possessed by the lecturer (operation 417) and the host terminal 10 accepts the request for the floor (operation 418). Successively, the conferencing control server 18 requests the media relay 14 to reassign resources in response to the acceptance of the request for the floor (operation 419) and the media relay 14 reassigns resources in response to the request from the media relay 14 (operation 420). The media relay 14 causes voice from the participating terminal 12 which is possessed by the student who has been given the floor to be transferred to the host terminal 10 which is possessed by the lecturer and participating terminals which are possessed by other students, and mixes video images so that video images of the participating terminal 12 are transferred to the other terminals.

Successively, the conferencing control server 18 transfers a response of accepting the request for the floor to the participating terminal 12 that has requested the floor (operation 421). Then, the participating terminal 12 creates a question message (operation 422). When a question is asked, the host terminal 10 requests the conferencing control server 18 to withdraw the floor from the participating terminal 12 (operation 423). The conferencing control server 18 transfers the request to the participating terminal 12 (operation 424) and receives a response signal from the participating terminal 12 (operation 425).

Then, the conferencing control server 18 requests the media relay 14 to change a media connection in response to the withdrawal of the floor (operation 426) and receives a response signal from the media relay 14 (operation 427). At this time, the media relay 14 mixes video images to transfer video images of the host terminal 10 to the participating terminal 12. Then, the conferencing control server 18 transfers a response to the withdrawal of the floor to the host terminal 10 (operation 428) and the lecture continues (operation 429).

Meanwhile, when the lecture ends, the host terminal 10 logs out of the lecture to request the conferencing control server 18 to terminate the lecture (operation 430), and the conferencing control server 18 transmits connection release signals from students to the host terminal 12 (operation 431). In addition, the conferencing control server 18 transfers a signal indicating that video conferencing has ended to the media relay 14 to release resources for video conferencing and resources for connections (operation 432).

FIGS. 5A through 5E illustrate examples of methods in which the media relay 14 combines video images.

Referring to FIGS. 5A through 5E, the media relay 14 acquires video images from a plurality of terminals (that is, a first conferencing terminal, a second conferencing terminal, ..., an n-th conferencing terminal). Then, the media relay 14 selectively combines the acquired video images and provides the selectively combined video images to the first through n-th conferencing terminals, respectively.

In the tele-education service system 1, it is assumed that the first conferencing terminal is a host terminal that is possessed by a lecturer and the second, third, ..., n-th conferencing terminals are participating terminals that are possessed by students.

Figure 5A:
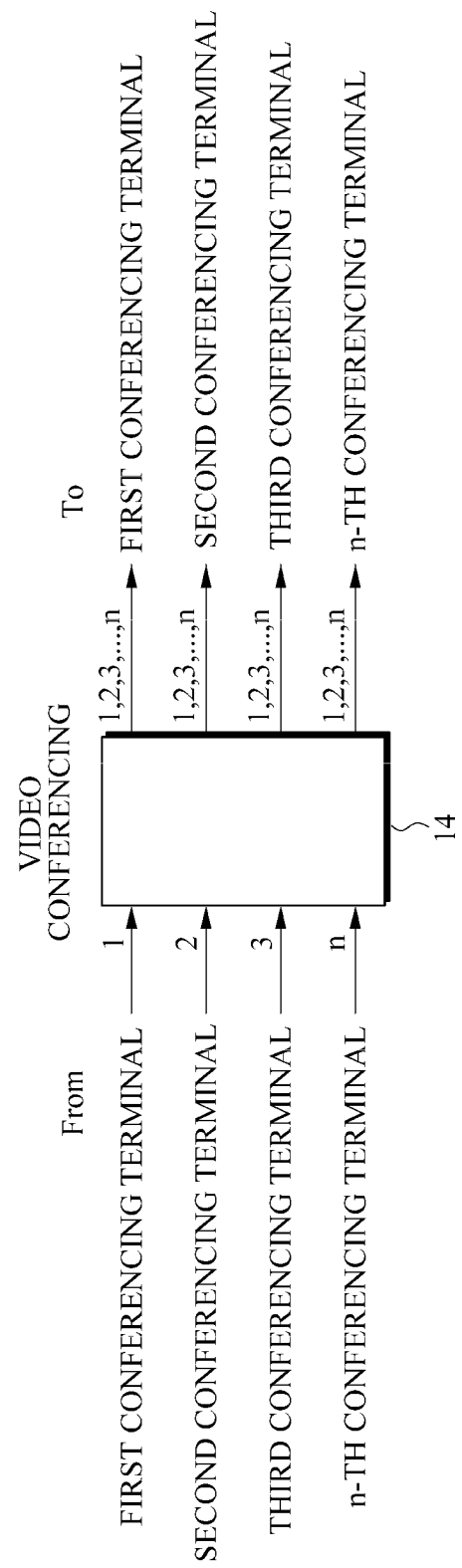
FIGS. 5A through 5E illustrate examples of methods in which the media relay combines video images.

Referring to FIG. 5A, the media replay 14 collectively mixes video images acquired from all terminals and transmits the mixed video images to all the terminals. That is, the media relay 14 mixes video images received from the first, second, third, ..., n-th conferencing terminals and transmits the mixed video images to the first, second, third, ..., n-th conferencing terminals, respectively.

Figure 5B:
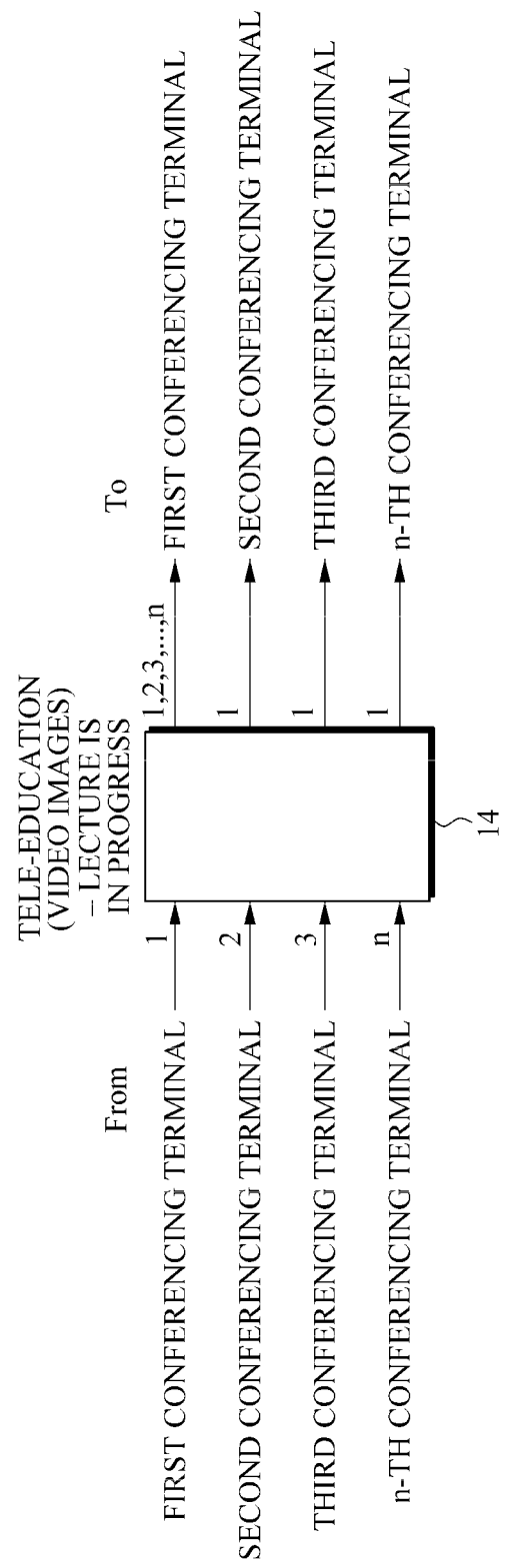

Referring to FIG. 5B, the media relay 14 distinguishes a first conferencing terminal which is possessed by a lecturer from participating terminals which are possessed by students to create two groups and combines video images for each group for a real-time tele-education service.

For example, when a lecturer lectures through the first conferencing terminal among the first, second, third, ..., n-th conferencing terminals, the media relay 14 mixes video images acquired by all terminals and provides the mixed video images to the first conferencing terminal. Meanwhile, the media relay 14 provides video images including video images acquired by the first conferencing terminal to the second, third, ..., n-th conferencing terminals which are possessed by students. However, the media relay 14 may provide only video images provided by the lecturer to the students.

Accordingly, since the lecturer can acquire video images from all the students, the lecturer may recognize the state of each student in real time. Also, since each student can receive only video images provided by the lecturer without receiving video images from other students, the student may maintain good concentration on a screen.

Figure 5C:
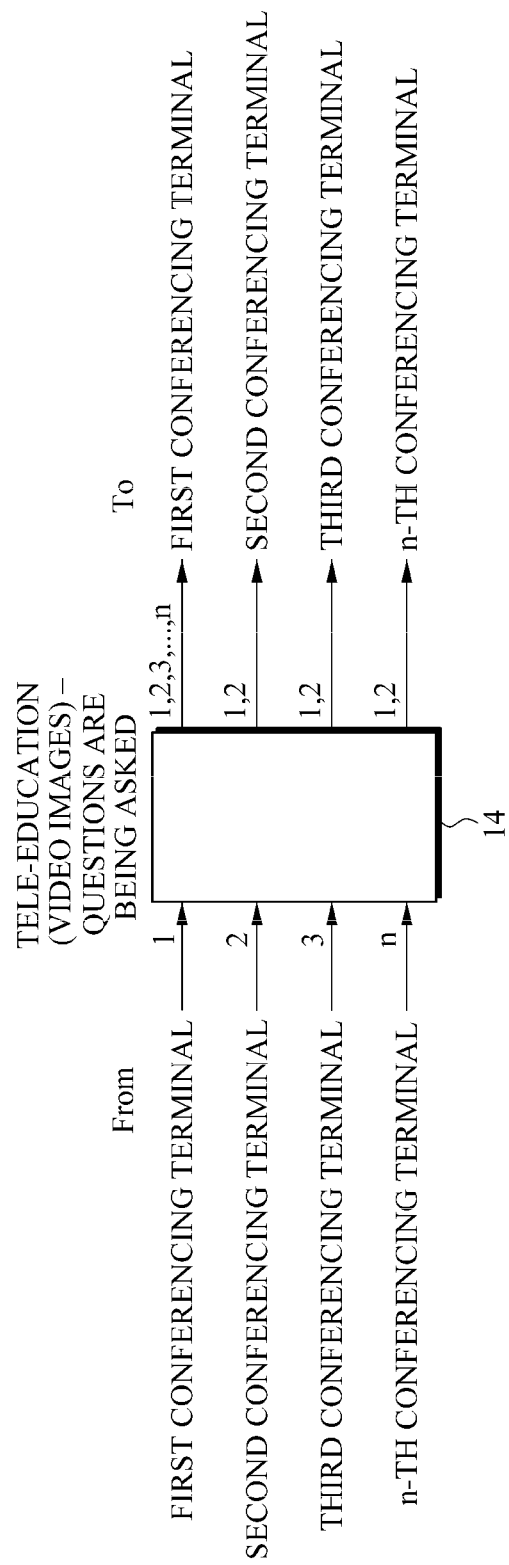

Referring to FIG. 5C, since a student who possesses the second conferencing terminal among the first, second, third, ... n-th conferencing terminals transmits a question request message, the media relay 14 mixes video images acquired by all the first through n-th conferencing terminals and provides the mixed video images to the first conferencing terminal. Then, the media relay 14 mixes video images acquired by the first conferencing terminal with video images acquired by the second conferencing terminal that has sent the question request message and provides the mixed video images to the second, third, ..., n-th conferencing terminals which are students' terminals, respectively.

Figure 5D:
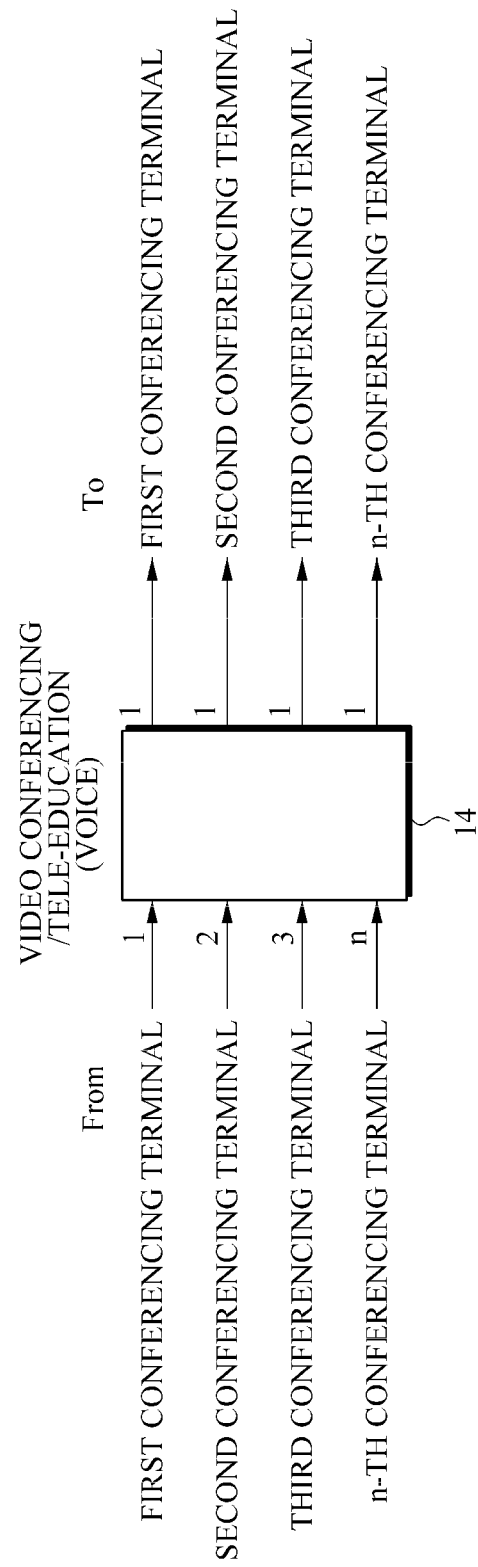

Referring to FIG. 5D, when a lecturer who possesses the first conferencing terminal among the first, second, third, ..., n-th conferencing terminals lectures, the media relay 14 provides voice acquired by the first conferencing terminal to the second, third, ..., n-th conferencing terminals which are students' terminals.

Figure 5E:
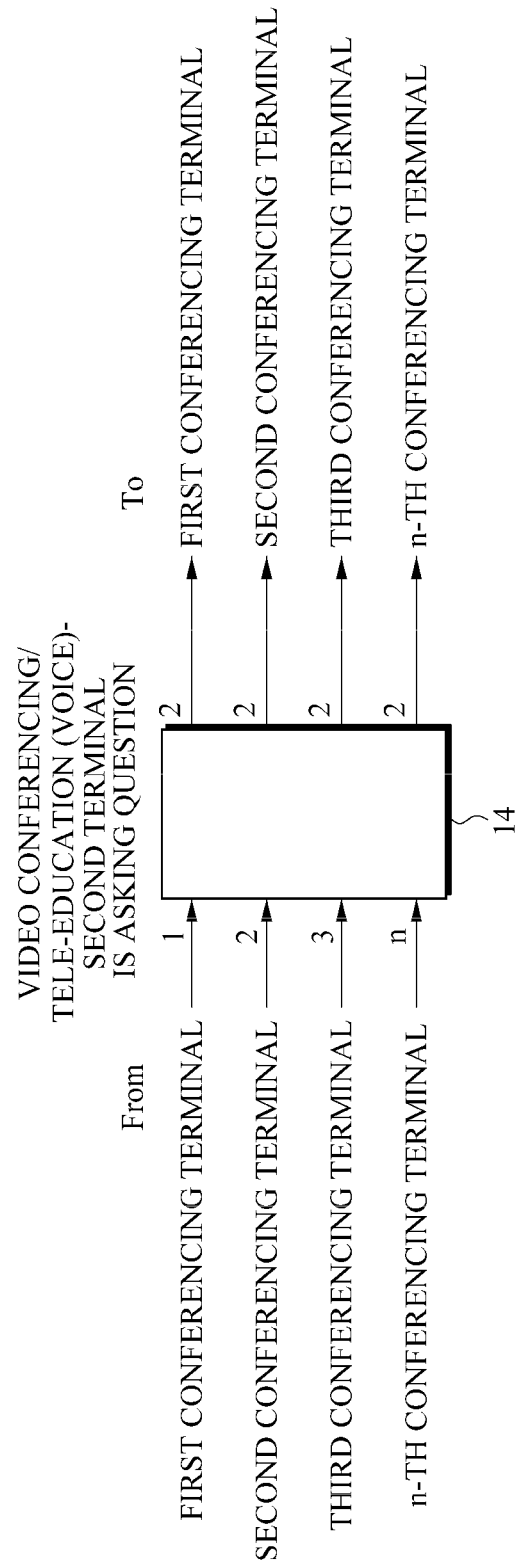

Referring to FIG. 5E, when a student who possesses the second conferencing terminal among the first, second, third, ..., n-th conferencing terminals transmits a question request message, the media relay 14 provides voice acquired by the second conferencing terminal to all the first, second, third, ..., n-th conferencing terminals.

Figure 6:
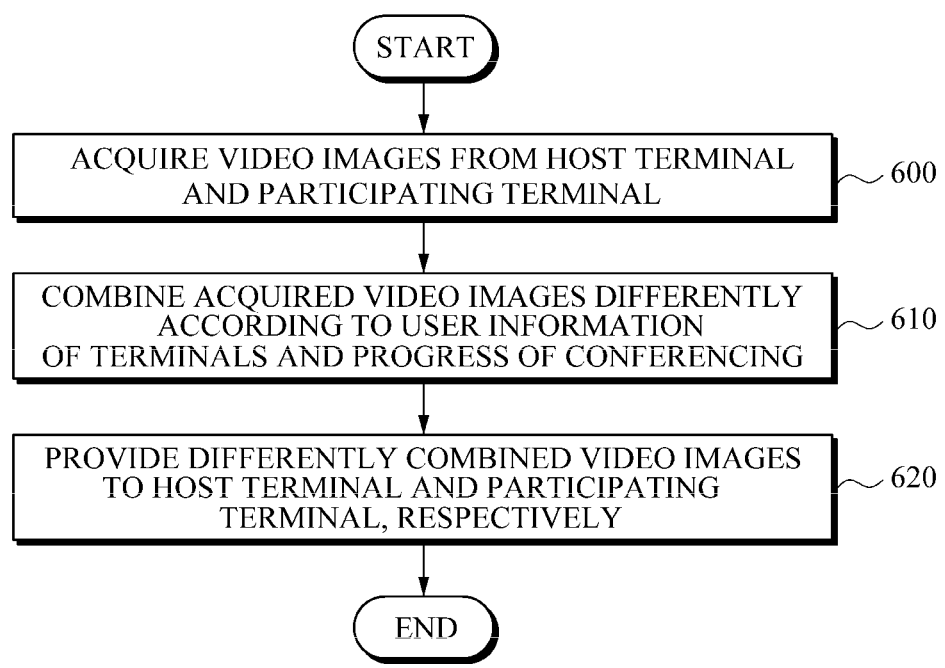
FIG. 6 is a flowchart illustrating an example of a tele-education service-providing method based on video conferencing.

FIG. 6 is a flowchart illustrating an example of a tele-education service-providing method based on video conferencing.

Referring to FIG. 6, the media relay 14 (see FIG. 1) which relays a video conferencing-based tele-education service between terminals acquires video images from a plurality of terminals (operation 600). The media relay 14 may acquire video images from a host terminal that manages a tele-education service and a participating terminal that receives the tele-education service.

Successively, the media relay 14 combines the acquired video images differently according to user information of the terminals and the progress stages of video conferencing (operation 610). According to an example, the media relay 14 may mix video images acquired by the participating terminal, provide the mixed video images to the host terminal and provide video images acquired by the host terminal to the participating terminal. Successively, the media relay 14 provides the differently combined video images to the host terminal and participating terminal, respectively (operation 620).

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A media relay which relays a tele-education service based on video conferencing between terminals, comprising:
   an image acquiring unit to acquire video images from a plurality of terminals; and
   an image provider to combine the acquired video images differently according to user information of the plurality of terminals and the progress stages of video conferencing and to provide the differently combined video images to the plurality of terminals, respectively.

2. The media relay of claim 1, wherein the image acquiring unit acquires video images from a host terminal which manages a tele-education service and at least one participating terminal which receives the tele-education service.

3. The media relay of claim 2, wherein the host terminal is a lecturer's terminal that provides the tele-education service and the at least one participating terminal is a student's terminal that receives the tele-education service.

4. The media relay of claim 2, wherein the image provider mixes video images acquired by the at least one participating terminal, provides the mixed video images to the host terminal, and provides video images acquired by the host terminal to the at least one participating terminal.

5. The media relay of claim 2, wherein the image acquiring unit acquires one of video images acquired by a camera connected to the host terminal or video images output through an application program of the host terminal, from the host terminal, and the image provider provides the acquired video image to the at least one participating terminal.

6. The media relay of claim 2, wherein, when receiving a signal for requesting the floor from a participating terminal among the at least one participating terminal, the image provider mixes video images acquired by the at least one participating terminal and provides the mixed video images to the host terminal, mixes video images acquired by the host terminal with video images acquired by the participating terminal that has sent the signal for requesting the floor and provides the mixed video images to the at least one participating terminal.

7. The media relay of claim 2, wherein, when receiving a signal for requesting the floor, the image provider mixes video images acquired by the at least one participating terminal, provides the mixed video images to the host terminal, and provides video images acquired by the host terminal to the at least one participating terminal.

8. The media relay of claim 2, wherein the image provider selects predetermined video images from among the acquired video images for each of the at least one participating terminal and mixes the selected video images.

9. The media relay of claim 1, wherein the image provider provides voice and video images received from a terminal that has sent a signal for requesting the floor among the plurality of terminals to the plurality of terminals.

10. The media relay of claim 1, wherein the image acquiring unit to simultaneously acquire video images from a plurality of terminals.

11. The media relay of claim 1, wherein the image provider to combine the acquired video images according to a combination selected among a plurality of combinations.

12. A host terminal which manages a tele-education service based on video conferencing with at least one participating terminal, comprising:

an image selector to select one of video images acquired through an interface connected to the host terminal and video images output through an application program of the host terminal; and a selected image provider to provide the selected video image to the at least one participating terminal through a network, wherein the application program is a software program installed on the host terminal.

13. The host terminal of claim 12, further comprising:

an image display to acquire video images from a camera and display the acquired video images;

a voice reproducer to acquire voice from a microphone and reproduce the acquired voice; and an application program controller to output video images through the application program to output a screen and to capture the screen and transmit the screen to at least one participating terminal.

14. The host terminal of claim 12, wherein, when receiving a signal for requesting proceeding of video conferencing, the image selector selects the video images acquired through the interface.

15. The host terminal of claim 12, further comprising a selection signal receiver to receive a selection signal for selecting one from among the video images acquired through the interface and the video images output through the application program of the host terminal, wherein the selected image provider provides a video image selected according to the selection signal.

16. A tele-education service system based on video conferencing, comprising:

a host terminal to manage a tele-education service system;

at least one participating terminal to receive the tele-education service; and a media relay to acquire video images from the host terminal and the at least one participating terminal, to combine the acquired video images differently according to user information of the host terminal and the at least one participating terminal and the progress stages of video conferencing and to provide the differently combined video images to the host terminal and the at least one participating terminal, respectively.

17. The tele-education service system of claim 16, wherein the media relay provides video images acquired by the at least one participating terminal to the host terminal and provides video images acquired by the host terminal to the at least one participating terminal.

18. The tele-education service system of claim 16, wherein the host terminal selects one of video images acquired through an interface connected to the host terminal and video images acquired through an application program of the host terminal, and the media relay provides the selected video image to the at least one participating terminal.

19. The tele-education service system of claim 16, further comprising a tele-education server to manage the tele-education service at a remote site.

20. The tele-education service system of claim 19, further comprising a conferencing control server to receive a signal for requesting starting of video conferencing from the tele-education server or the host terminal to establish a video conferencing session, and to control a connection between the at least one participating terminal and the media relay.

21. A method of providing a tele-education service based on video conferencing, comprising:

acquiring video images from a host terminal that manages a tele-education service and at least one participating terminal that receives the tele-education service;

combining the acquired video images differently according to user information of the host terminal and the at least one participating terminal and the progress stages of video conferencing; and providing the differently combined video images to the host terminal and the at least one participating terminal, respectively.

22. The method of claim 21, wherein the providing of the differently combined video images to the host terminal and the at least one participating terminal comprises mixing video images acquired by the at least one participating terminal and providing the mixed video images to the host terminal, and providing video images acquired by the host terminal to the at least one participating terminal.

* * * * *